(12) United States Patent
Goupil et al.

(10) Patent No.: US 12,428,163 B2
(45) Date of Patent: Sep. 30, 2025

(54) CONNECTING ASSEMBLY FOR CONNECTING TWO AIRCRAFT STRUCTURES, AIRCRAFT PART COMPRISING SUCH ASSEMBLY, AND AIRCRAFT

(71) Applicant: Airbus Operations SAS, Toulouse (FR)

(72) Inventors: Frédéric Goupil, Toulouse (FR); Xavier Matheis, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 713 days.

(21) Appl. No.: 17/706,890

(22) Filed: Mar. 29, 2022

(65) Prior Publication Data
US 2022/0332405 A1  Oct. 20, 2022

(30) Foreign Application Priority Data

Mar. 31, 2021 (FR) ...................................... 2103310

(51) Int. Cl.
*B64D 11/06*  (2006.01)
*B64C 1/18*  (2006.01)
*F16F 1/40*  (2006.01)

(52) U.S. Cl.
CPC ............ *B64D 11/0696* (2013.01); *B64C 1/18* (2013.01); *F16F 1/40* (2013.01)

(58) Field of Classification Search
CPC ......... B62D 33/0604; B64C 1/18; B64C 1/20; B64D 11/06; B64D 11/0619; B64D 11/0696; F16B 5/0241; F16B 5/025; F16B 5/0258; F16B 9/05; F16B 9/052; F16B 9/058; F16B 9/07; F16F 1/38; F16F 1/3807; F16F 1/3821; F16F 1/3842; F16F 1/3849; F16F 1/40; Y10T 403/405; Y10T 403/45; Y10T 403/454; Y10T 403/458
USPC ................................ 403/203, 220, 224, 228
See application file for complete search history.

(56) References Cited

U.S. PATENT DOCUMENTS

| | | | | |
|---|---|---|---|---|
| 3,949,975 A | * | 4/1976 | Miers | B62D 33/0604 267/141 |
| 4,003,330 A | * | 1/1977 | Compton | F16F 1/38 440/111 |
| 4,032,125 A | * | 6/1977 | Minakawa | F16F 1/3935 267/294 |

(Continued)

FOREIGN PATENT DOCUMENTS

| | | | |
|---|---|---|---|
| DE | 4036538 A1 | 5/1992 | |
| EP | 1384915 A2 * | 1/2004 | ................ F16F 1/38 |

(Continued)

*Primary Examiner* — Josh Skroupa
(74) *Attorney, Agent, or Firm* — Greer, Burns & Crain, Ltd.

(57) ABSTRACT

A connecting assembly for connecting two structures of an aircraft, the connecting assembly including a central element featuring a through-hole, preferably a bore, configured to make a connection with one of the two structures by virtue of a fastener element including a shank inserted into the through-hole. The connecting assembly further includes a plurality of shock-absorbing elements made from a deformable material. Each of the shock-absorbing elements are, on the one hand, secured to the central element and, on the other hand, configured to bear against a surface of the other of the two structures. An aircraft part includes such a connecting assembly.

10 Claims, 6 Drawing Sheets

(56) References Cited

U.S. PATENT DOCUMENTS

| | | | | |
|---|---|---|---|---|
| 5,641,153 A | * | 6/1997 | Gwinn | B62D 33/0604 |
| | | | | 267/141.1 |
| 5,988,610 A | * | 11/1999 | Hiraki | F16F 1/38 |
| | | | | 267/141.1 |
| 6,017,073 A | | 1/2000 | Lindblom et al. | |
| 7,201,367 B2 | * | 4/2007 | Wietharn | F16F 1/403 |
| | | | | 267/141 |
| 7,635,117 B2 | * | 12/2009 | Heuer | F16F 1/3821 |
| | | | | 267/141.1 |
| 10,088,009 B2 | * | 10/2018 | Nydam | B62D 33/0604 |
| 2004/0101360 A1 | | 5/2004 | Schwartz et al. | |

FOREIGN PATENT DOCUMENTS

| | | | | |
|---|---|---|---|---|
| GB | 2471563 A | | 1/2011 | |
| JP | 2000193003 A | * | 7/2000 | F16F 1/38 |
| JP | 2011140289 A | * | 7/2011 | F16F 1/36 |
| WO | 2016034649 A1 | | 3/2016 | |
| WO | 2019198393 A1 | | 10/2019 | |

* cited by examiner

CONNECTING ASSEMBLY FOR CONNECTING TWO AIRCRAFT STRUCTURES, AIRCRAFT PART COMPRISING SUCH ASSEMBLY, AND AIRCRAFT

CROSS-REFERENCES TO RELATED APPLICATIONS

This application claims the benefit of the French patent application No. 2103310 filed on Mar. 31, 2021, the entire disclosures of which are incorporated herein by way of reference.

FIELD OF THE INVENTION

The present invention relates to the assembling of aircraft structures. The invention relates more particularly to the assembling of aircraft floor rails with other elements of a primary structure of this aircraft, notably over a landing gear well or a central wing box.

BACKGROUND OF THE INVENTION

Connecting devices are used to transfer load between the passenger seats of an aircraft and elements of the primary structure of the aircraft. One specific region of the aircraft, over a landing gear well or a central wing box features particular constraints as to how a floor accepting seats intended to accommodate passengers (also known as the "cabin floor") is to be attached. Specifically, in such a region, structural constraints mean that this region is very cluttered and no transverse beam can therefore be used for attaching a floor.

Systems providing connection between a floor for accepting passenger seats and elements of the primary structure do exist, but these suffer from a number of disadvantages. For example, the installation, adjustment and outfitting of floor rails are made more complex by a significant number of tools and accessories that have to be employed almost simultaneously. Furthermore, high assembly tolerances, along multiple assembly axes lead to difficulties with mounting the floor, or else to problems with the flatness of the floor, these being liable, for example, to detract from the perception of quality of assembly of the aircraft that the operators thereof may then have. Finally, the fixed connections used are liable to transmit, between the primary structure of an aircraft and the cabin floor thereof, vibrations originating from the fuselage or from the engines, for example, leading to vibratory phenomena and an appreciable noise level, particularly inside the cabin in which the passengers are installed.

The situation therefore has room for improvement.

SUMMARY OF THE INVENTION

It is an object of the present invention to propose an optimized connecting assembly for connecting two structures of an aircraft.

To this end, what is proposed is a deformable connecting assembly for connecting two structures of an aircraft, comprising a central element featuring a through-hole, preferably a bore, designed to make a connection with one of the two structures by virtue of a fastener element comprising a shank inserted into the through-hole, the connecting assembly further comprising a plurality of deformable shock-absorbing elements, each of the first shock-absorbing elements being, on the one hand, secured to the central element and, on the other hand, configured to bear against a surface of the other of the two structures.

Such an arrangement notably allows easier, quicker, assembly and improved filtering of vibrations coming from the aircraft fuselage.

According to one embodiment, the connecting assembly further comprises at least two other shock-absorbing elements, referred to as second shock-absorbing elements, manufactured from a deformable material, and, on the one hand, secured to the central element and, on the other hand, extending as far as a predetermined distance away from a surface of the other structure, the second shock-absorbing elements potentially comprising one or more metal inserts or inserts made from a material other than the deformable material and/or one or more cavities arranged in the deformable material, Advantageously, the first shock-absorbing elements each extend outwards, from the central element, in a direction perpendicular to a longitudinal axis of the through-hole.

According to one embodiment, the first shock-absorbing elements are stacks of alternating layers respectively made from a deformable material and of a material other than the deformable material.

Advantageously, the second shock-absorbing elements, each extend outwards, from the central element, in a direction perpendicular to the longitudinal axis of the through-hole, which direction is different from the direction in which the first shock-absorbing elements extend.

According to one embodiment, the connecting assembly features six faces, pairs of which are parallel, and of which:
two faces referred to as "first faces" have the through-hole passing through them, the longitudinal axis defining a first reference direction,
two faces referred to as "second faces" bear the first shock-absorbing elements which are monobloc or else in the form of stacks of alternating layers made from a deformable material and of elements made of a material other than the deformable material, extending from the central element in a second reference direction perpendicular to the longitudinal axis of the through-hole,
two faces referred to as "third faces" bear the second shock-absorbing elements and each extend outwards from the central element in a third reference direction, perpendicular to the longitudinal axis of the through-hole, and perpendicular to the second reference direction.

Advantageously, the third reference direction is parallel to a longitudinal axis of the fuselage of an aircraft, the second reference direction is contained in a vertical or substantially vertical plane, and the first reference direction is contained in a horizontal or substantially horizontal plane.

According to one embodiment, the stacks of alternating layers each comprise at least two layers of the deformable material and two elements made of another material, preferably metallic.

According to one embodiment, the deformable material is an elastomer and the fastener element is a threaded fastener comprising an elongate bolt and a nut, the bolt comprising a shank portion configured to be inserted into the through-hole of the central element of the connecting assembly.

Another object of the invention is an aircraft part comprising a first structure, a second structure and a connecting assembly as described, configured and assembled for connecting the first structure to the second structure, and wherein:

the first structure comprises a through-cavity of a shape that complements an exterior profile of the connecting assembly and designed to house the connecting assembly therein, the facing part of each of the first shock-absorbing elements coming to bear against or being securely fastened to a surface of the cavity, the second structure comprises a groove designed to accommodate part of the first structure comprising the cavity, each of the edges of the groove comprising one of two through-openings positioned facing one another and wherein the fastener element is a threaded fastener passing through the openings of the edges of the groove and the through-hole of the central element of the connecting assembly.

According to one embodiment, the through-hole of the aircraft part is a first bore featuring a first diameter and a first central longitudinal axis, and an insertion guide is assembled on one of the outer edges of the groove, the insertion guide comprising a second bore of a second diameter slightly greater than the diameter of the first bore, and the second bore featuring a second central longitudinal axis coincident or substantially coincident with the first central longitudinal axis of the through-hole, the through-openings having a diameter greater than the first diameter and preferably equal to the second diameter.

A further object of the invention is an aircraft comprising an aircraft part as described hereinabove and therefore comprising a connecting assembly as aforementioned.

BRIEF DESCRIPTION OF THE DRAWINGS

The above-mentioned features of the invention, together with others, will become more clearly apparent from reading the following description of one exemplary embodiment, the description being given with reference to the attached drawings, among which.

DETAILED DESCRIPTION OF THE PREFERRED EMBODIMENTS

Figure 1:
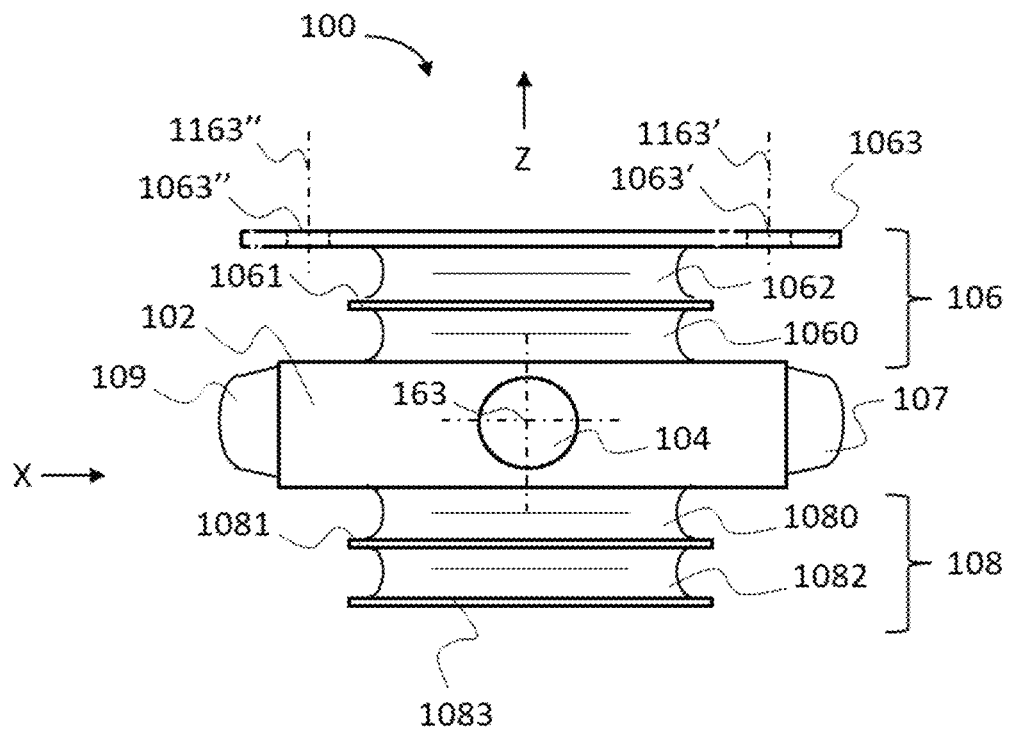
FIGS. 1 and 2 are schematic diagrams illustrating a connecting assembly connecting two structures of an aircraft according to one embodiment.

FIG. 1 schematically depicts a connecting assembly 100 intended to make a mechanical connection between two structures of an aircraft, such as, for example, on the one hand a primary structure or a primary structure element and, on the other hand, another primary structure element. According to the example described hereinafter, the connecting assembly is configured to make a connection between, on the one hand, a primary structure element of a landing gear well or a central wing box, and, on the other hand, a cabin floor rail. Such an example is nonlimiting and the connecting assembly 100 could equally well be used for making a connection between two elements each forming part of a primary, secondary or tertiary structure of an aircraft.

According to the example described, a connection is made between, on the one hand, a fitting of a primary structure of an aircraft and, on the other hand, an inverted U-shaped rail of a cabin floor structure of this same aircraft.

Figure 2:
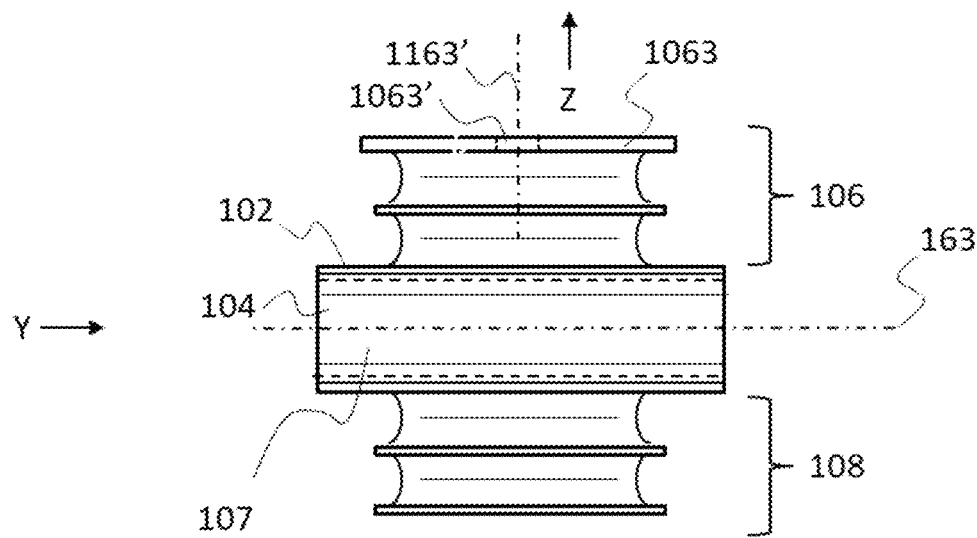

To do this, the connecting assembly 100 illustrated in FIGS. 1 and 2 comprises a central element 102 in which there is a through-hole 104. The through-hole 104 is preferably a bore. The through-hole 104 is of longilinear overall shape. Two stacks 106, and 108, secured to the central element 102, extend outwards from the central element 102. Each of these two stacks 106 and 108 comprises an alternation of layers made respectively of a deformable material and of metal. For example, the layers made of a deformable material are manufactured in elastomer and the layers made of metal are, for example, steel plates or sheet metal conforming to precise characteristics, notably in terms of dimensions and particularly in terms of thickness. The elastomer used itself conforms to precise characteristics dependent on the desired tensile and compressive strength, and the desired shear strength. According to one embodiment, the stack 106, attached to the upper part of the central element 102, comprises a first layer of deformable material 1060, a first metal layer (or plate) 1061, a second layer of deformable material 1062, a second metal layer (or second metal plate) 1063. The layers 1060, 1061, 1062 and 1063 therefore constitute an alternating stack of layers of deformable material and of metallic layers. According to one embodiment, the stack 108, attached to the lower part of the central element 102, comprises a first layer of deformable material 1080, a first metal layer (or plate) 1081, a second layer of deformable material 1082, a second metal layer (or second metal plate) 1083. The layers 1080, 1081, 1082 and 1083 constitute a stack of alternating layers of materials. According to one embodiment, the metal plate 1063 has two perforations 1063' and 1063" designed so that, for example, threaded fasteners can be inserted into them to secure them to a structure. The perforations 1063' and 1063" are respectively arranged along central axes 1163' and 1163". The perforations 1063' and 1063" are, in other words, through-holes in the metal layer (or plate) 1063 and configured so that threaded fasteners or other equivalent fastener elements can be engaged therein for the purposes of coupling the connecting assembly 100 to a structure or to a structural element. The connecting assembly 100 may thus in this way, on the one hand, be attached to a first structure or to a first structural element using a first fastener element comprising a shank inserted into the through-hole 104, for example a threaded fastener passing through the through-hole 104 when this is a bore and, on the other hand, be attached to a second structure or to an element of a second structure using fastener elements respectively inserted into the perforations 1063' and 1063" of the metal plate 1063. These fastener elements are, for example, threaded fasteners and the perforations 1063' and 1063" are, for example, bores. It should be noted that, for the purposes of the description and to better explain the transfers of forces that take place via the connecting assembly 100, it is defined here and by convention that a longitudinal axis of the through-hole 104, for example the central axis 163 thereof, describes a direction Y, referred to as reference direction Y. Likewise by convention and for the same purposes, a direction Z referred to as reference direction Z, depicted by an arrow Z in FIGS. 1 and 2, is defined. This direction Z is perpendicular or substantially perpendicular to the direction Y. Still following the same reasoning, and for the same purposes, a direction X, referred to as reference direction X, depicted by an arrow X in FIGS. 1 and 2 is defined. This direction X is perpendicular or substantially perpendicular to the reference direction Z and to the reference direction Y and is advantageously oriented parallel to a longitudinal axis of the fuselage of an aircraft comprising such a connecting assembly. As a preference, the directions X, Y and Z are thus mutually perpendicular and form an orthonormal frame of reference or, in other words, a three-dimensional Cartesian frame of reference.

According to one embodiment of the invention, the stacks 106 and 108 extend outwards, from the central element 102 of the connecting assembly 100, in the reference direction Z. The outermost layers, namely in this instance the layers 1063 and 1083 are advantageously each configured to bear against a surface of a structure other than the structure connected to the connecting assembly 100 via the through-hole 104. Advantageously, the layers 1063 and 1083 are thus configured to bear against that one of the two structures connected by the assembly 100 which is not the structure attached to the assembly 100 by a fastener element inserted into the through-hole 104. Thus, the connecting assembly 100, which is deformable in compression and in shear, is configured to make a deformable connection capable of facilitating assembly thereof (assembly of the connection) by virtue of its ability to absorb variations in the structure attached to it, since the latter structure, which may possibly be made up of several "sub-elements", may create disparities in terms of the positioning of fixing points. The connecting assembly 100 is furthermore advantageously capable of filtering vibrations between a first and a second structure it connects.

According to one embodiment, the connecting assembly 100 further comprises at least two shock-absorbing elements 107 and 109, likewise manufactured from a deformable material but securely attached to the central element 102. According to one embodiment of the invention, the shock-absorbing elements 107 and 109 each extend as far as a predetermined distance from a surface of the structure that is not connected to the connecting assembly 100 via the through-hole 104 of the central element 102. Advantageously, the functional clearance thus created makes assembly significantly easier. According to one embodiment, the predetermined distance between the outer bearing surface of each of the shock-absorbing elements 107 and 109 and a surface of the structure on which they are intended to bear in the event of deformation of the assembly 100, is the same for both shock-absorbing elements 107 and 109. In a variant, this predetermined distance that allows the connecting assembly 100 to deform in the direction X before one of the shock-absorbing elements 107 or 109 comes into contact with a structural surface, is different for each of the shock-absorbing elements 107 and 109. Advantageously, that both makes assembly easier and provides a shock-absorbing function once the connection between the two structures has been assembled. According to one embodiment, the shock-absorbing elements 107, 109 each comprise one or more metallic inserts and/or one or more cavities arranged in the deformable material, this then giving them a structure similar to that of the stacks 106 and 108.

According to one embodiment, the predetermined distance is comprised between 1 mm and 5 mm, preferably between 1 mm and 3 mm, and more preferably still, between 1 mm and 2 mm.

According to one embodiment, the predetermined distance between the shock-absorbing elements 107 and 109 and the bearing surfaces they encounter is zero, and the corresponding functional clearance that makes assembly easier is achieved by means of the presence of at least one cavity in each of the shock-absorbing elements 107 and 109.

Cleverly, an alternation of layers of deformable material and of layers of metal for the stacks 106 and 108, and a different alternation of layers of deformable material and of layers of metal (or of cavities) for the shock-absorbing elements 107 and 109 allows precise and tailored control of the compression-strength and shear-strength characteristics of the connecting assembly 100.

FIG. 2 schematically depicts the connecting assembly 100 already depicted in FIG. 1 when viewed from the right, in this part of FIG. 1. In this figure it may be seen that the through-hole 104 is, in the example illustrated, a bore produced around an axis 163 of the bore 104, which conventionally defines the direction Y. The axis 163 is the central axis of the bore 104. It may also be seen that, in the example described, the stacks 106 and 108 of alternating layers extend outwards from the central element 102 in a direction parallel to the reference direction Z and the shock-absorbing elements 107 and 109 extend outwards from the central element 102 in a direction parallel to the reference direction X. According to one embodiment of the invention, the various layers of the stacks 106 and 108 are assembled by bonding, and the stacks 106 and 108, as well as the shock-absorbing elements 107 and 109, are attached to the central element 102 likewise by bonding, for example during a curing phase.

In a variant, the assembling of the various elements of the connecting assembly 100 is performed during a molding operation.

According to one embodiment of the invention, the central element is preferably parallelepipedal so that it features six faces, pairs of which are parallel and respectively referred to as "first faces", "second faces" and "third faces".

The two faces referred to as "first faces" of the central element 102 have, passing through them, the through-hole 104 of which the longitudinal axis 163 defines the reference direction Y. The two faces referred to as "second faces" bear the stacks of alternating layers 106 and 108 made from a deformable material and of metallic elements, extending from the central element 102 in the reference direction Z, perpendicular to the longitudinal axis 163 of the through-hole 104, and therefore perpendicular to the reference direction Y. The two faces referred to as "third faces" bear the shock-absorbing elements 107 and 109, each extending outwards from the central element 102 in the reference direction X, perpendicular to the longitudinal axis 163 of the through-hole 104, and at the same time perpendicular to the reference direction Z.

Thus, when the metal plate 1063 is attached inside an inverted U-shaped rail of a cabin floor structure, the rail being assembled is longitudinally along a longitudinal axis of an aircraft fuselage, and when at the same time the central element 102 is securely attached to a primary structure of the aircraft, the connecting assembly 100 advantageously provides for a transfer of load imparted along the rail and from the passenger seats to the rest of the primary structure in the region in which the connecting assembly 100 is being used, and vice versa. A first advantage lies in the fact that the connecting assembly 100 provides improved filtering of shocks, vibrations and therefore noise passing from the fuselage toward the floor and the passenger seats attached thereto.

Advantageously, the structure of the connecting assembly 100 comprising a stack (sandwich) of elastomer and of metal has nonlinear stiffnesses which are defined with precision according to a so-called "differentiated and non-linear flexibilities" design. Specifically, the central element 102 can move in the reference directions X, Y and Z with respect to the structure attached to the upper end plate 1063. A second advantage is that the installation of a floor rail using a connecting assembly 100 is greatly simplified and therefore quicker. Specifically, the ability of the central element 102 to move in the reference directions X, Y and Z with respect to the structure attached to the upper end plate 1063 means that the installation and machining tolerances can be absorbed during assembling. Thus, after securing, a cabin floor rail attached to the end plate 1063 is advantageously completely uncoupled from the aircraft primary structure connected to the central element 102, or a part thereof that is connected to the central element 102, which is to say that there is no rigid connection connecting the cabin floor rail to the primary structure, for example the structure of a landing gear well or of a central wing box or an element of one of these structures. Advantageously, any relative movement of the cabin floor rail secured by means of the plate (or layer of metal) 1063 with respect to the primary structure of a landing gear well or of a central wing box, for example, leads to deformation of the stacks 106 and 108 such that noise, vibration and shocks coming from the fuselage towards the structure of the rail and therefore towards the passenger seats can be greatly filtered or attenuated. Advantageously, and thanks to the use of an elastomer-metal sandwich structure, it is possible to control both the stiffness and the non-linearity characteristics of the connecting assembly 100 and therefore of a mechanical connection performed by a connecting assembly similar to the connecting assembly 100. Advantageously, various connecting assemblies according to the aforementioned principle, offering distinct stiffness and non-linearity characteristics, can be used at different points of the structure of an aircraft, according to the connecting and filtration requirements, and therefore according to specific fitting requirements. For example, connecting assemblies according to the principle described may comprise more alternations of alternating layers of elastomer and of metal than others. One important advantage of the sandwich structure described is that it is possible to obtain a high ratio between the compressive and shear stiffnesses. In addition, the use of the shock-absorbing elements 107 and 109 makes it possible to obtain a "bump-stop" effect by virtue of a free travel in the reference direction X before the shock-absorbing elements 107 and 109 (either the one or the other depending on the direction of travel) becomes compressed on a rigid surface, as a result of the predetermined distance there is between the connecting assembly 100 and the bearing surfaces encountered, or else as a result of the presence of at least one cavity in each of the shock-absorbing elements 107 and 109. The separations there are in the reference direction X, between the shock-absorbing elements and the bearing surfaces encountered are such that small forces are needed for installing the connecting assembly 100.

Advantageously, for optimal load transfer between the cabin floor structure 150 and the primary structure 130, and for the assembling of these two structures to be as easy as possible, the reference direction X is parallel to a longitudinal axis of the fuselage of the aircraft carrying these structures, the reference direction Z is contained in a vertical or substantially vertical plane and the reference direction Y is contained in a horizontal or substantially horizontal plane.

The low shear stiffness along the axis X of the connecting assembly 100 means that mechanical clearances originating from the predetermined distances or from the cavities present in the shock-absorbing elements can be absorbed during assembly, and the remarkable incompressibility of the elastomer materials allows optimal filtration and load transfer between the two structures.

According to another embodiment, all or some of the metallic layers or plates of the stacks 106 and 108 and/or of the shock absorbing elements 107 and 109 are replaced by layers or plates made of a material other than metal. Thus, the layers or plates 1061, 1063, 1081 and 1083 may be made from a composite material, a thermoplastic material, a material made of fabric and/or of wood, these examples being nonlimiting. More generally, any material of which the elastic modulus is at least several hundred times greater than that of the elastomer may be suitable for creating the stacks 106 and 108 or else for inserting intermediate layers in the shock-absorbing elements 107 and 109, where appropriate.

According to yet another embodiment, the stacks 106 and 108 are replaced by "monobloc" shock-absorbing elements and do not have intermediate layers that are metallic or made from a material other than the deformable material, such as the layers or plates 1061, 1063, 1081 and 1083 previously described. In other words and according to this embodiment, the shock-absorbing elements 106 and 108 are not laminated in the direction Z and/or the shock-absorbing elements 107 and 109 are not laminated in the direction X. According to this embodiment, the shock-absorbing elements 106 and 108 are then made only of a deformable material, such as elastomer for example, and therefore constitute shock-absorbing elements similar, in terms of structure, to the shock-absorbing elements 107 and 109. Advantageously, the arrangement whereby, on the one hand, monobloc shock-absorbing elements extend from the central element 102 in the reference direction Z and, on the other hand, other shock-absorbing elements extend from the central element 102 in the reference direction X, nevertheless advantageously, despite a simplified structure of at least the shock-absorbing elements 106 and 108, affords the benefit of distinct characteristics in terms of the deformations and load transfers in different directions.

According to this embodiment, the "stacks" 106 and 108 described according to other embodiments therefore need to be considered as first shock-absorbing elements 106 and 108 and the shock-absorbing elements 107 and 109 need to be considered as second shock-absorbing elements 107 and 109.

Advantageously, when the first shock-absorbing elements 106 and 108 are monobloc and made only of a deformable material, such as elastomer for example, they may nevertheless each comprise one or more cavities of reduced dimensions so as to facilitate the insertion of the connecting assembly 100 into a cavity of a shape that complements the overall shape of the module.

Figure 3:
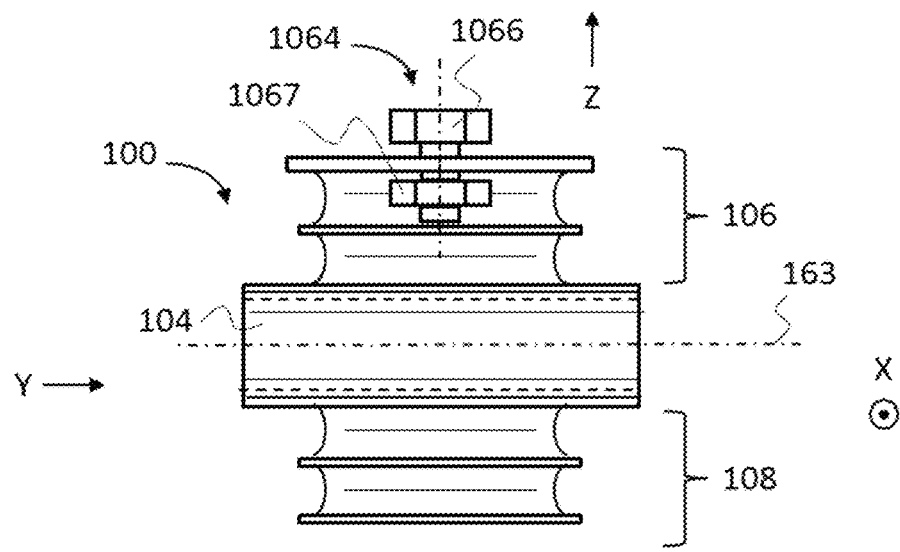
FIGS. 3 and 4 are schematic depictions illustrating means for attaching the connecting assembly already illustrated in FIGS. 1 and 2 to two structures of an aircraft, according to one embodiment.

FIG. 3 depicts the connecting assembly 100 when fastener elements of the threaded fastener type are inserted into the perforations 1063' and 1063" of the metal plate 1063. In the view depicted, a threaded fastener 1064 inserted into the perforation 1063' can be seen. The threaded fastener 1064 for example comprises a bolt 1066 combined with a nut 1067. Thus, in the example described, the connecting assembly 100 is configured to be attached to one of the structures that are connected by the metal end plate 1063 of the stack 106. Of course, such attachment had also be achieved using the attachment end plate 1083 of the stack 108, or else using both end plates 1063 and 1083 at the same time, depending on the shape of each of the two structures being assembled, and connected by the connecting assembly 100.

Figure 4:
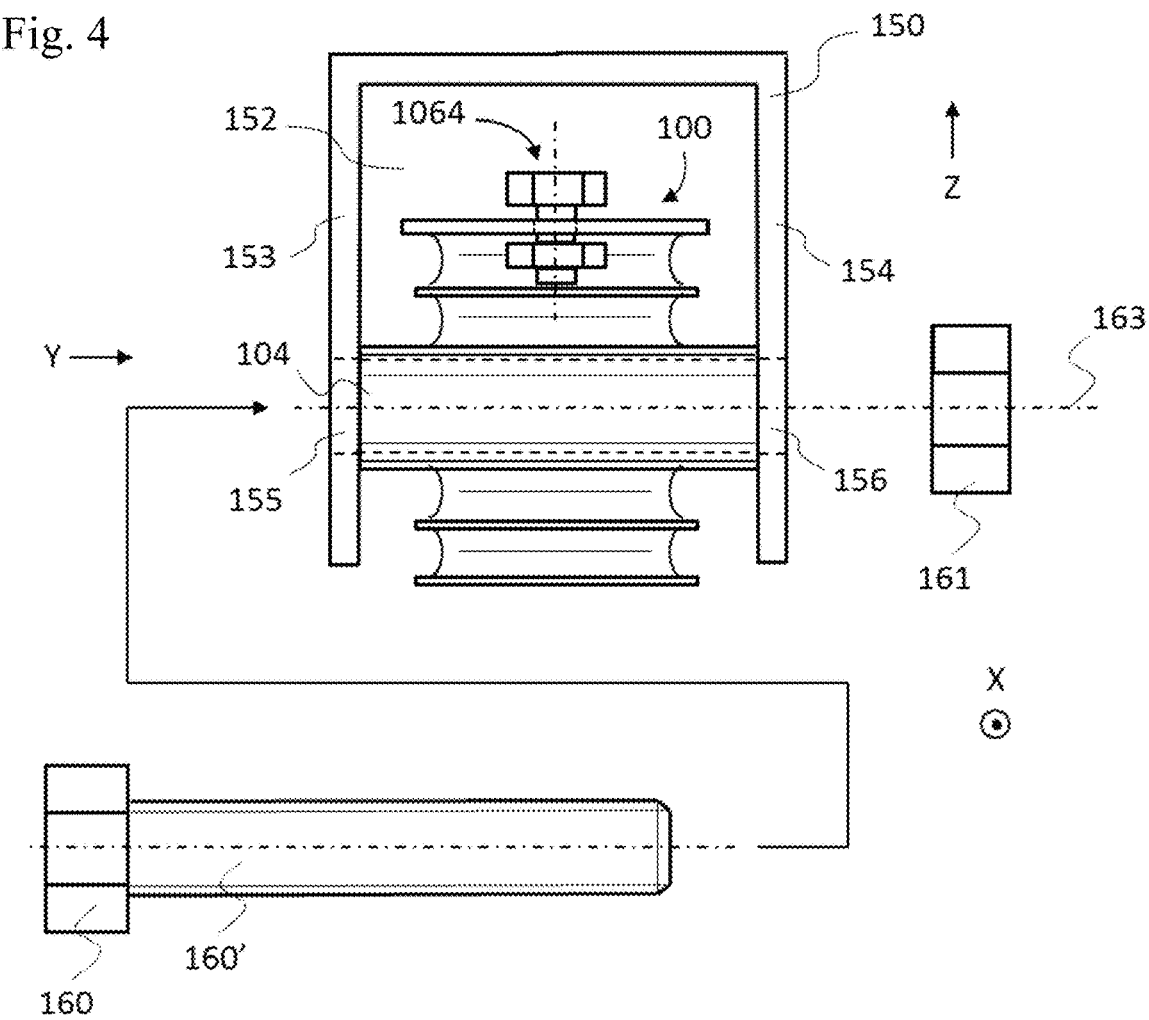

FIG. 4 schematically depicts a connection between a connecting assembly 100 and a structure 150 using a fastener element of the threaded fastener type made up of a bolt 160 and of a nut 161. According to one embodiment, the structure 150 is a cabin floor rail of inverted U-shaped profile. In the present description, the inside of the inverted U-shaped rail is considered to be like a groove arranged in the structure 150, and the edges of the inverted U-shaped rail are referred to as the edges of the groove. Thus, the structure 150, namely in this instance the cabin floor rail, features a groove 152 and two flanks also referred to as groove edges 153 and 154 which delimit the groove 152 in the reference direction Y. The edges 153 and 154 of the groove 152 of the structure 150 each feature an opening. One opening 155 is arranged in the edge 153, and one opening 156 is arranged in the edge 154, facing the opening 155. The openings 155 and 156 are arranged in such a way that when the rail 150 is positioned so that it straddles the connecting assembly 100, the connecting assembly 100 and the rail 150 can be attached to one another using a threaded fastener comprising the bolt 160 and the nut 161 when the shank 160' of the threaded fastener is fully inserted into the through-hole 104 of the central element 102 of the connecting assembly 100. With this assembly, the shank portion 160' of the bolt 160 passes through the edge 153 via the opening 155, then through the central element 102 via the through-hole 104, then the edge 154 via the opening 156 before the nut 161 is fitted tightly onto the threaded end of the shank 160' of the bolt 160. Thus, in the example described in FIG. 4, the edge 153 of the groove 152 is held between the head of the bolt 160 and a face of the central element 102, and the edge 154 of the groove 152 is held between the tightened nut 161 and another face of the central element 102, the opposite face to the face against which the head of the bolt 160 bears. Of course, the example described is nonlimiting and another fastener element functionally equivalent to the threaded fastener made up of the bolt 160 and of the nut 161 may be used.

Figure 5:
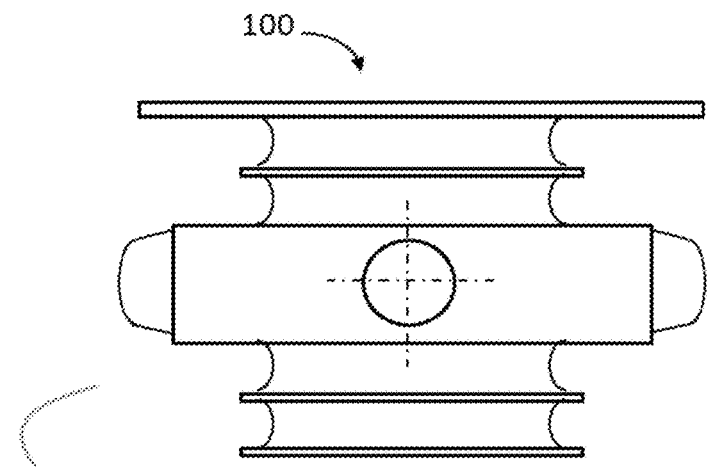
FIGS. 5 and 6 are schematic depictions illustrating the connecting assembly already depicted in FIGS. 1-4 secured in a through-cavity of a structure of an aircraft, according to one embodiment.
Figure 6:
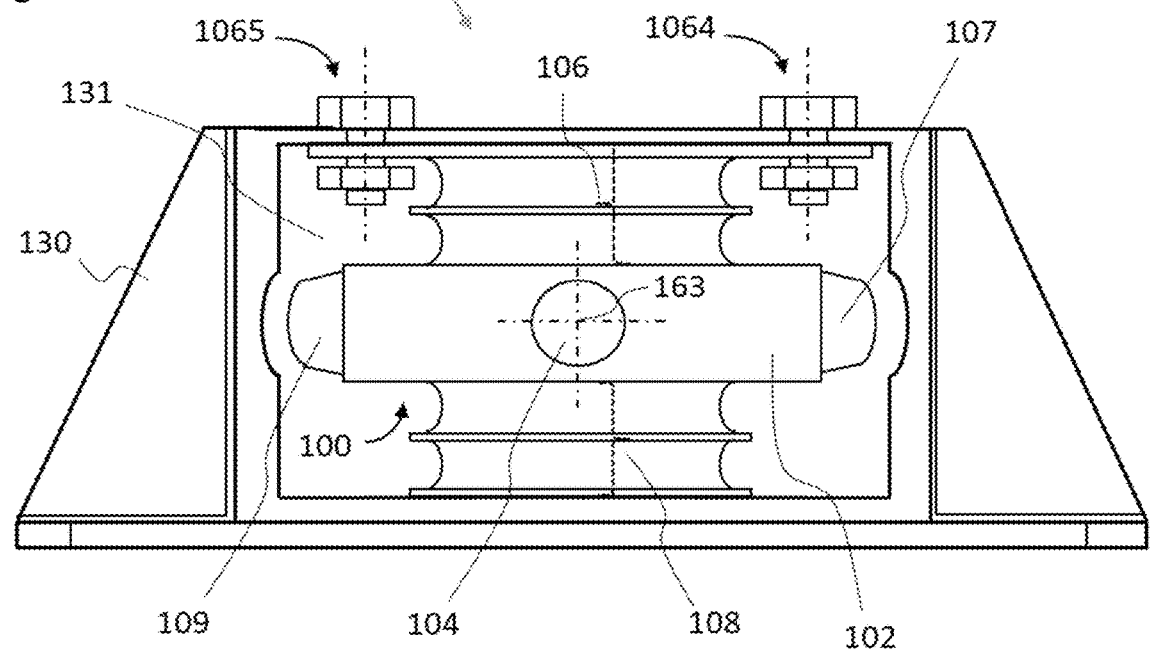

FIG. 5 schematically depicts the mounting of the connecting assembly 100 already described in FIG. 1 in a primary structure 130 of an aircraft, or more specifically in a primary structure element 130 of an aircraft, according to one embodiment. The connecting assembly 100 is mounted in a fitting of the structure 130 that exhibits a through-cavity 131. More specifically, the connecting assembly 100 is housed in the through-cavity 131 of the structure 130 and is attached by means of two threaded fasteners 1064 and 1065. Thus, according to the example described, FIG. 3 illustrates a means of assembling and of attaching to one another the connecting assembly 100 and the structure 150, namely a cabin floor rail, and FIG. 5 illustrates means of assembling and of attaching to one another the connecting assembly 100 and a primary structure of an aircraft.

Figure 7:
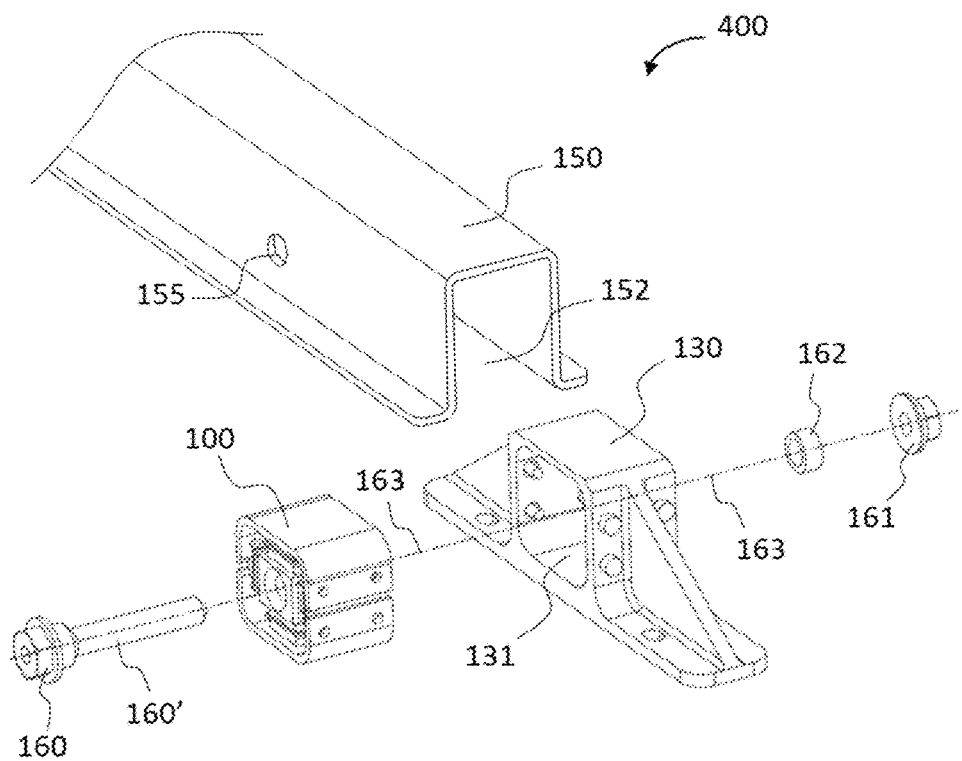
FIG. 7 is a perspective view of part of an aircraft comprising a connecting assembly for connecting two aircraft structures according to the principle already illustrated in FIGS. 1 and 2 and according to one embodiment of the invention.

FIG. 7 is a perspective depiction of an assembly of an aircraft part 400 comprising the cabin floor rail, or structure 150, aircraft primary structure element 130, and a connecting assembly 100 that connects the two structures 130 and 150, prior to assembling. FIG. 7 better shows the insertion of the connecting assembly 100 into the through-cavity 131 of structure 130, and then the way in which the inverted U-shaped floor rail 150 straddles the assembly formed by the connecting assembly 100 and the structure 130, and finally the securing of this assembly by means of a bolt 160 coupled with a nut 161 when the shank 160' of the bolt 160 is inserted successively through the opening 155 of a first edge of the groove 152 of the rail 150, then through the through-hole 104 of the connecting assembly 100, and then through the opening of the second edge of the groove 152, not visible in the figure, and finally through the screw thread of the nut 161. According to the embodiment illustrated, a bearing 162 is used in the opening, not visible in this figure, in the second edge of the groove, to facilitate mounting. The elements 160, 161, 100, 130, 155, 156, 162 and 161 are therefore all aligned along the axis 163 defined by the longitudinal central axis of the through-hole of the connecting assembly 100. In the example illustrated in FIG. 8, the metal end plates 1063 and 1083 of the stacks 106 and 108 of alternating layers of elastomer and of metal have U-shapes that complement the surfaces of the through-cavity 131 and are positioned facing these after assembling.

Figure 8:
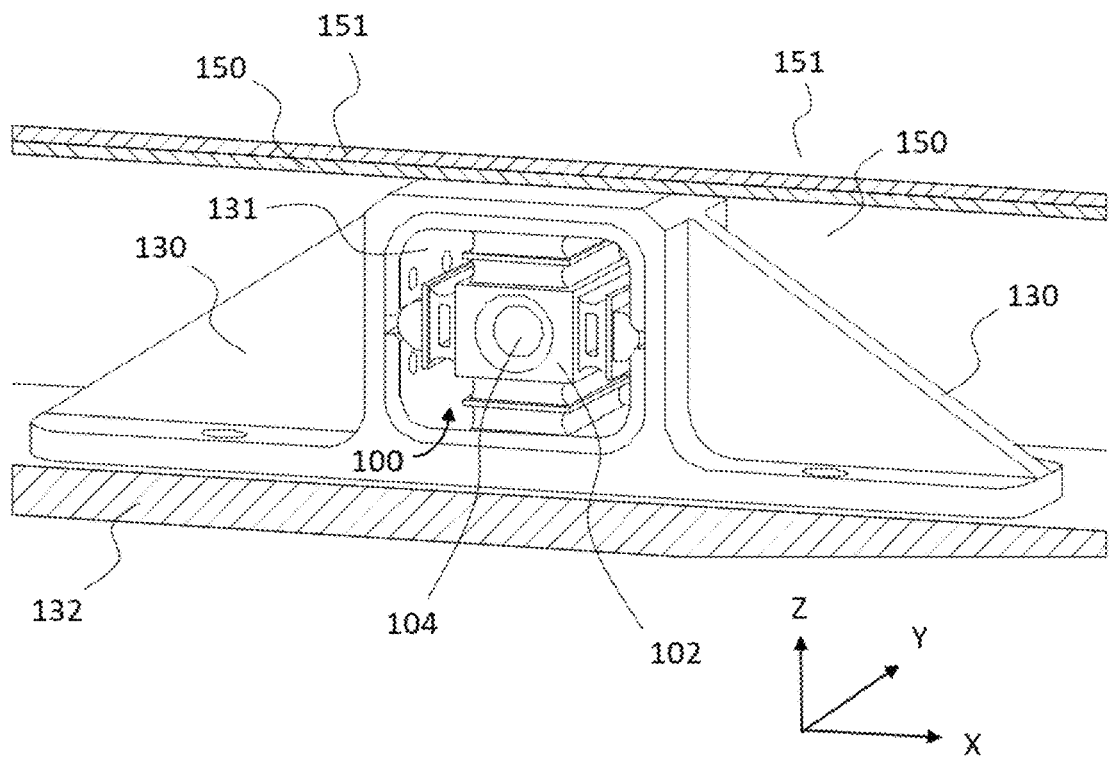
FIG. 8 is a perspective view of a connecting assembly for connecting two aircraft structures according to the principle already illustrated in FIGS. 1 and 2, the view comprising cross sections through structural elements.

FIG. 8 is a schematic depiction illustrating the assembly of the elements of the aircraft part 400 already depicted in FIG. 7, after assembling, but without the fastener elements of the threaded fastener type. The illustration of the structure 150 comprises a partial cross section through same providing a better depiction of the insertion of the structure element 130 into the structure 150 which, according to the embodiment described, is none other than a cabin floor rail in the shape of an inverted U. The structure element 130 is mounted on another primary structure element 132, for example a landing gear well or a central wing box. A floor 151 is assembled on the cabin floor rail 150. According to one embodiment of the invention, the floor 151 is made up of a metal plate welded to the cabin floor rail 150 or comprises such a plate. According to one embodiment, the passenger seats are assembled on the floor 151 directly, or via intermediate attachment means.

Figure 9:
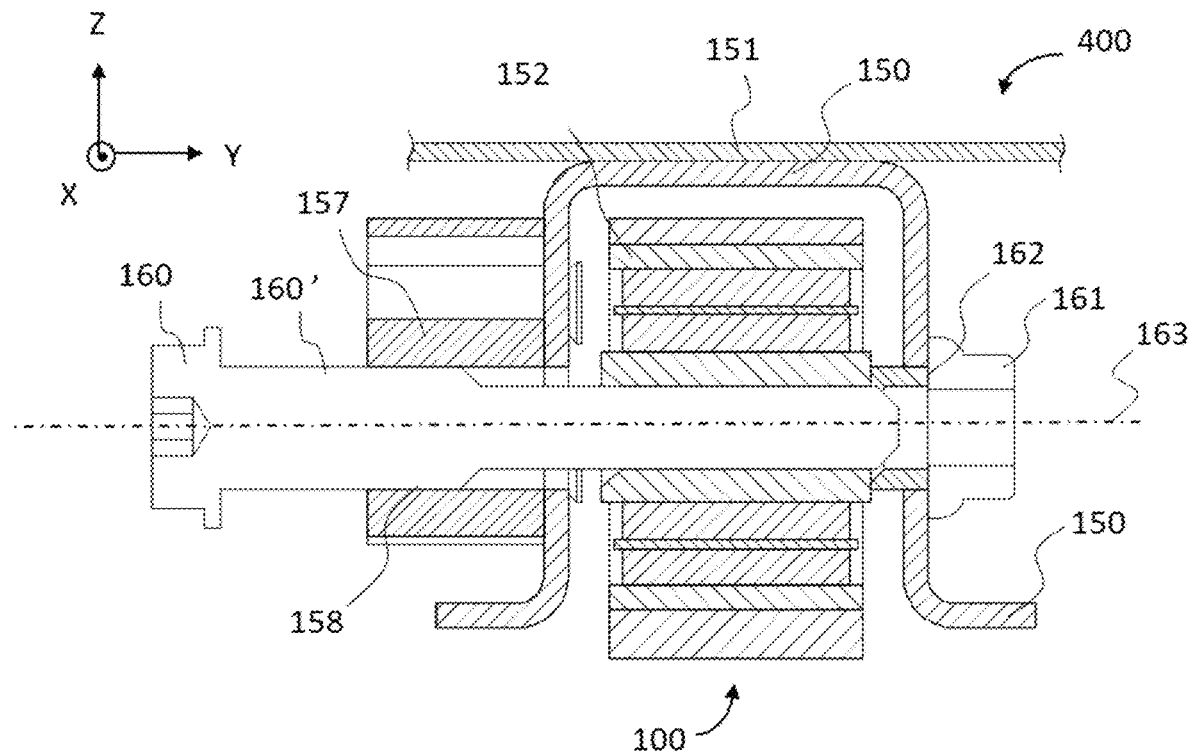
FIG. 9 is a cross section through an aircraft part comprising a connecting assembly according to the principle already depicted in FIGS. 1 and 2, during the course of assembly, and according to one embodiment.

FIG. 9 is a cross section in the reference direction X depicting a mechanical connection of two structures 130 and 150 of the aircraft parts 400, by means of the connecting assembly 100, during insertion of the bolt 160 into the through-hole 104 of the central element 102 towards the nut 161. Advantageously, a guide 157 having a bore 158 is used to simplify the assembly operations. Specifically, according to the embodiment depicted in FIG. 9, the shank 160' of the bolt 160 features two portions with different diameters. Thus, the portion near the bolt head has a greater diameter than the portion near that end of the shank 160' that is intended to accept the nut 161, and the diameter of the bore 158 is greater than the diameter of the bore 104 of the central element 102 of the connecting assembly 100. Thus, it is easily possible to engage the shank 160' of the bolt 160, and the guide 157 therefore pre-positions the bolt 160 to face the bore 104 of the central element 102. Furthermore, according to the embodiment illustrated in FIG. 9, the side of the bore 104 present facing the insertion guide 157 has a chamfer, once again in order to facilitate insertion of the bolt 160 into the bore 104 of the central element 102. Thus, when the shank 160' of the bolt 160 is already engaged in the insertion guide 157 and in the bore 104 of the central element 102, the deformation of the stacks of alternating layers of elastomer and of metal is such that the end of the shank 160' of the bolt 160 is aligned with the opening 156 present in the edge of the groove (rail) situated on the opposite side of the rail to the side that bears the insertion guide 157. The insertion of the bolt 160 through the connecting assembly 100 and the rail 150 is made far easier as a result. The angle between the surface of the chamfered parts and the axis 163 of the bore 104 may be larger or smaller depending on the advantage sought. Thus, a somewhat small angle is able to cover a wider range of tolerance values on assembly whereas a wider angle prioritizes ease of insertion. Assembling operations are consequently far quicker. According to the embodiment depicted in FIG. 9, the central element 102 of the connecting assembly 100 is blocked against translational movement in the direction Y between the chamfer of the bolt 160 and the edge of the rail 150 situated on the same side as the nut 161. The connecting assembly 100 may however be able to move in the directions X, Y and Z, as a result of its deformable structure, thereby advantageously allowing the transfer of load between the cabin floor 151, secured to the structure 150, and the primary structure 130 of the aircraft. The bearing 162 arranged in the opening 156 of the edge of the rail 150, between the central element 102 and the nut 161, makes the assembly easier to assemble.

Figure 10:
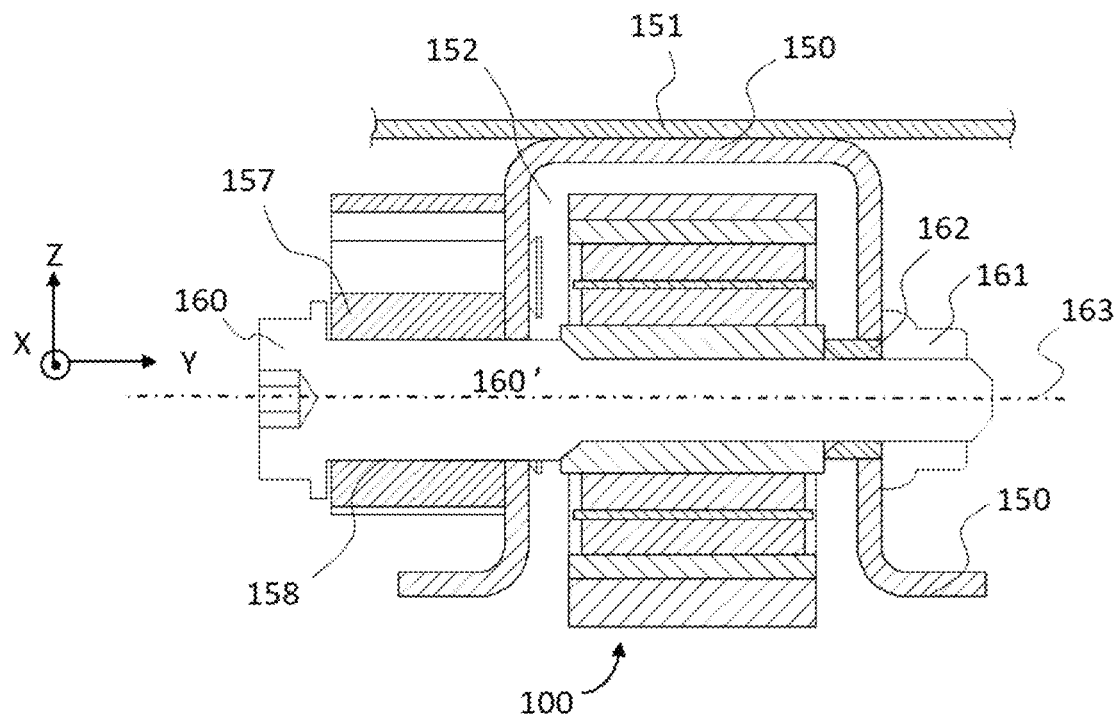
FIG. 10 is a cross section through an aircraft part comprising the connecting assembly already depicted in FIG. 9, after assembly.

FIG. 10 illustrates the elements already depicted in FIG. 9 after assembly, when the bolt 160 has been inserted through all the elements 157, 102, 150, 162 and the nut 161 has been mounted on the bolt 160 and tightened.

Figure 11:
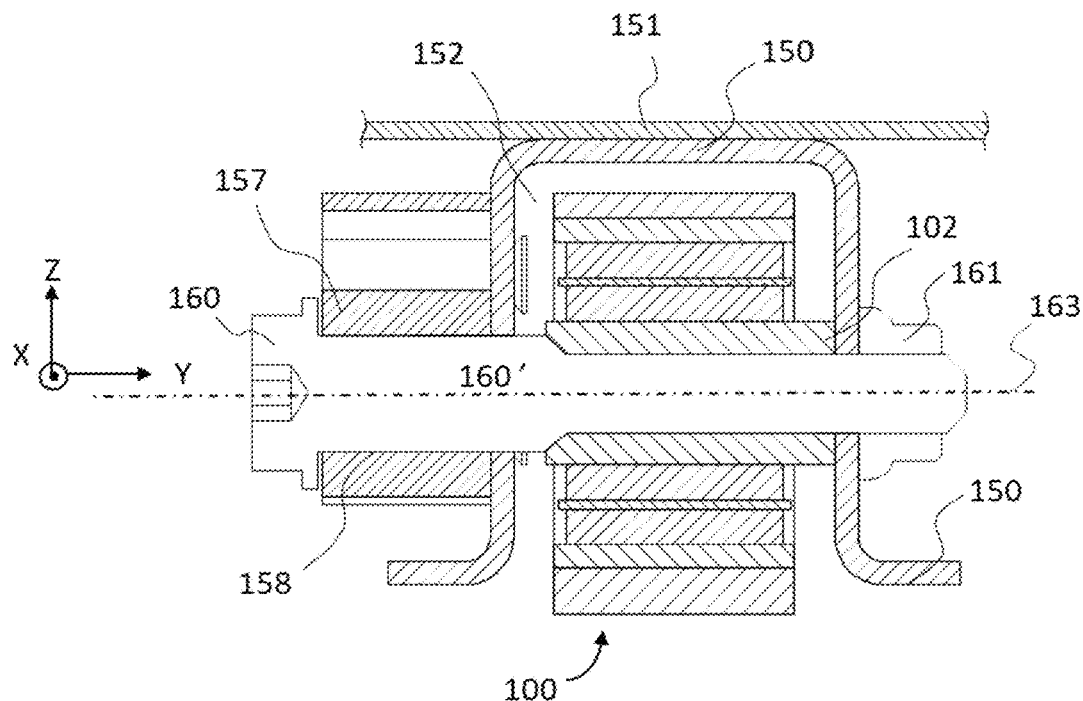
FIG. 11 is a cross section through an aircraft part comprising a connecting assembly according to the principle already depicted in FIGS. 1 and 2, after assembly, and according to a variant of the embodiment illustrated in FIG. 9 and FIG. 10.

FIG. 11 depicts a variant of the embodiment already depicted in FIG. 9 and FIG. 10, whereby no use is made of a bearing 162 arranged in the opening 156, and the central element 102 is extended in the direction Y to bear against the edge of the cabin floor rail 150.

Figure 12:
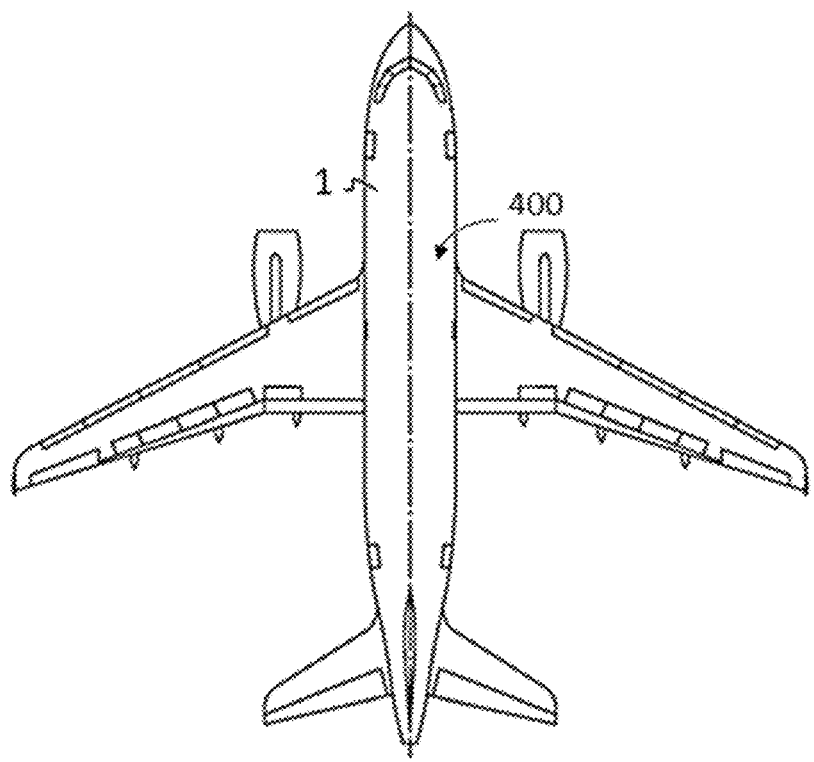
FIG. 12 is a schematic depiction of an aircraft comprising an aircraft part as already depicted in FIG. 8, FIG. 9, FIG. 10 and FIG. 11.

FIG. 12 depicts an aircraft 1 comprising the aircraft part 400, which aircraft part 400 comprises at least a part of the structure 130, at least a part of the cabin floor rail structure 150, the connecting assembly 100 assembled between these two structures 130 and 150 and the fastener element made up at least of the bolt 160 and of the nut 161, and the fastener element or elements for attaching the connecting assembly 100 to the structure 130, for example the threaded fasteners 1064 and 1065.

The invention is not restricted to only the embodiments and examples described hereinabove but covers any connecting assembly connecting two structures of an aircraft, comprising a central element attached to the first of the two structures and from which there extends at least two first shock-absorbing elements made of deformable material, the ends of which are positioned bearing against surfaces of the second structure that is connected by the connecting assembly, thus allowing the non-linear stiffness characteristics to be defined with precision, and potentially comprising two second shock-absorbing elements extending from the central element of the connecting assembly in a direction perpendicular to the direction in which the at least two first shock-absorbing elements extend.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connecting assembly for connecting two structures of an aircraft, the connecting assembly comprising:
   a central element featuring a through-hole configured to make a connection with a first of said two structures,
   a fastener element inserted into the through-hole,
   a plurality of deformable first shock-absorbing elements, each of the plurality of deformable first shock-absorbing elements being secured to said central element and configured to bear against a surface of a second of said two structures,
   a plurality of second shock-absorbing elements, manufactured from a deformable material, and secured to the central element, each of the plurality of second shock-absorbing elements comprising at least one of a metal insert, an insert made from a material other than said deformable material, or a cavity arranged in the deformable material,
   each deformable first shock-absorbing element extending outwardly from the central element in a direction perpendicular to a longitudinal axis of said through-hole,
   a deformable first shock-absorbing element in the plurality of deformable first shock-absorbing elements comprises a plate extending laterally outwardly, the plate having a plurality of apertures configured to receive fasteners therethrough, and
   each second shock-absorbing element extending outwardly from the central element in a direction perpendicular to the longitudinal axis of said through-hole, which direction is different from a direction in which each first deformable shock-absorbing element extends.

2. The connecting assembly according to claim 1, wherein each deformable first shock-absorbing element of the plurality of deformable first shock-absorbing elements is a stack of alternating layers respectively made from a deformable material and of elements made of another material.

3. The connecting assembly according to claim 1, wherein the central element features six faces, pairs of which are parallel, and of which:
   two first faces have said through-hole passing through them, said longitudinal axis defining a first reference direction,
   two second faces bear said stacks of alternating layers made from a deformable material and of elements made of another material, and extend from the central element in a second reference direction perpendicular to the longitudinal axis of the through-hole,
   two third faces bear said plurality of deformable first shock-absorbing elements, each of which extend outwardly from the central element in a third reference direction, perpendicular to the longitudinal axis of said through-hole and perpendicular to the second reference direction.

4. The connecting assembly according to claim 3, wherein the third reference direction is parallel to a longitudinal axis of a fuselage of an aircraft on which the connecting assembly is carried, the second reference direction is contained in a vertical or substantially vertical plane, and the first reference direction is contained in a horizontal or substantially horizontal plane.

5. The connecting assembly according to claim 2, wherein each stack of alternating layers comprises at least two layers of the deformable material and two elements made of another material, preferably metallic.

6. The connecting assembly according to claim 2, wherein the deformable material is an elastomer and the fastener element is a threaded fastener comprising a bolt and a nut, the bolt comprising a portion configured to be inserted into the through-hole of the central element of the connecting assembly.

7. An aircraft part comprising:
a first structure,
a second structure, and
a deformable connecting assembly according to claim 1 connecting the first structure to the second structure,
wherein the first structure is a primary structure, or a preliminary structural element of said aircraft part,
wherein the second structure is a passenger floor rail of said aircraft part,
wherein the first structure comprises a through-cavity of a shape that complements an exterior profile of the connecting assembly and is configured to house the connecting assembly therein, the facing part of each of said first shock-absorbing elements coming to bear against or being securely fastened to a surface of said cavity,
wherein the second structure comprises a groove configured to accommodate part of the first structure comprising said cavity, each edge of the groove comprising one of two through-openings positioned facing one another,
wherein the fastener element is a threaded fastener passing through said openings of the edges of said groove and said through-hole of a central element of the connecting assembly, and
wherein no rigid connection connects said passenger floor rail to the primary structure.

8. The aircraft part according to claim 7, wherein the through-hole is a first bore featuring a first diameter and a first central longitudinal axis and wherein an insertion guide is assembled on an outer edge of the groove, the insertion guide comprising a second bore of a second diameter greater than the diameter of the first bore, and the second bore featuring a second central longitudinal axis coincident or substantially coincident with said first central longitudinal axis, the through-openings having a diameter greater than the first diameter.

9. The aircraft part according to claim 8, wherein the though-openings have a diameter equal to the second diameter.

10. An aircraft comprising an aircraft part according to claim 7.

* * * * *